United States Patent
Nordbruch

(10) Patent No.: US 10,286,781 B2
(45) Date of Patent: May 14, 2019

(54) METHOD FOR THE AUTOMATIC EXECUTION OF AT LEAST ONE DRIVING FUNCTION OF A MOTOR VEHICLE

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/534,285

(22) PCT Filed: Nov. 26, 2015

(86) PCT No.: PCT/EP2015/077751
§ 371 (c)(1),
(2) Date: Jun. 8, 2017

(87) PCT Pub. No.: WO2016/091603
PCT Pub. Date: Jun. 16, 2016

(65) Prior Publication Data
US 2017/0341512 A1    Nov. 30, 2017

(30) Foreign Application Priority Data
Dec. 11, 2014   (DE) .................. 10 2014 225 562

(51) Int. Cl.
*B60K 28/06*   (2006.01)
*B60W 50/08*   (2012.01)
(Continued)

(52) U.S. Cl.
CPC .......... *B60K 28/066* (2013.01); *B60W 50/08* (2013.01); *B60W 50/082* (2013.01);
(Continued)

(58) Field of Classification Search
CPC ... B60K 28/066; B60W 50/08; B60W 50/082; B60W 50/12; B60W 50/14; B60W 50/16;
(Continued)

(56) References Cited

U.S. PATENT DOCUMENTS

2010/0002075 A1\* 1/2010 Jung ..................... B60K 28/06
                                                         348/78
2014/0043135 A1  2/2014 Kotecha et al.
(Continued)

FOREIGN PATENT DOCUMENTS

DE   102011005844 A1   9/2012
DE   102011085167 A1   4/2013
(Continued)

OTHER PUBLICATIONS

International Search Report for PCT/EP2015/077751, dated Mar. 3, 2016.

*Primary Examiner* — Laura N Nguyen
(74) *Attorney, Agent, or Firm* — Norton Rose Fulbright US LLP; Gerard Messina

(57) ABSTRACT

A method for the automatic execution of at least one driving function of a motor vehicle, in which it is checked whether the driver uses an unapproved electronic device. In the event that the driver is using an unapproved electronic device, a warning is output to the driver.

20 Claims, 1 Drawing Sheet

(51) Int. Cl.
  *B60W 50/16* (2012.01)
  *B60W 50/00* (2006.01)
  *B60W 50/14* (2012.01)
(52) U.S. Cl.
  CPC ..... *B60W 50/16* (2013.01); *B60W 2050/0072* (2013.01); *B60W 2050/143* (2013.01); *B60W 2050/146* (2013.01)
(58) Field of Classification Search
  CPC ... B60W 2050/0072; B60W 2050/143; B60W 2050/146; G07C 5/08; G08G 1/0175; H04M 1/72577; G06K 9/00832; G06K 9/00845
  See application file for complete search history.

(56) References Cited

U.S. PATENT DOCUMENTS

| | | | | |
|---|---|---|---|---|
| 2014/0058632 A1* | 2/2014 | Jungman | ............ | B60K 28/063 701/48 |
| 2014/0368628 A1* | 12/2014 | Tsou | ................. | G06K 9/00845 348/77 |
| 2015/0015386 A1* | 1/2015 | Langenhan | ........... | B60W 50/14 340/438 |
| 2015/0264558 A1* | 9/2015 | Wigton | ................ | G06K 9/0061 455/418 |
| 2016/0070900 A1* | 3/2016 | Kim | ........................ | G06F 21/34 726/3 |
| 2016/0094707 A1* | 3/2016 | Stuntebeck | ....... | H04M 1/72577 455/418 |
| 2016/0101784 A1* | 4/2016 | Olson | .................... | B60K 35/00 340/576 |

FOREIGN PATENT DOCUMENTS

| | | |
|---|---|---|
| DE | 102012201513 A1 | 8/2013 |
| JP | H11222051 A | 8/1999 |
| JP | 2002251690 A | 9/2002 |
| JP | 2003127703 A | 5/2003 |
| JP | 2012043253 A | 3/2012 |
| WO | 2014174183 A1 | 10/2014 |
| WO | WO 2014174183 A1 * 10/2014 | ............. B60K 37/06 |

\* cited by examiner

METHOD FOR THE AUTOMATIC EXECUTION OF AT LEAST ONE DRIVING FUNCTION OF A MOTOR VEHICLE

FIELD OF THE INVENTION

The present invention relates to a method for the automated execution of at least one driving function of a motor vehicle, to a device for the automated driving of a motor vehicle, and to the integration of an electronic device into the automated driving method.

BACKGROUND INFORMATION

Methods for the automated driving of motor vehicles encompass the control of the longitudinal and lateral movement of vehicles. A method for the automated control of a vehicle is discussed in the document DE 10 2011 005 844 A1. The document DE 10 2011 085 167 A1 discusses a method in which the vehicle is driving autonomously and the driver can attend to other matters during this phase without any risk. The driver is required to take control of the vehicle again only after a take-control prompt.

SUMMARY OF THE INVENTION

An objective of the present invention is the improvement of the method for automated driving. This objective is achieved by outputting a warning to the driver during the automated driving in the event the driver is using an electronic device that is not approved. The warning is meant to make it clear to the driver that he is using an unapproved electronic device and must refrain from using this device.

A system for monitoring the driver determines whether the driver is using an electronic device. This method may be carried out with the aid of a data-processing device in which the described method is stored as a program.

In addition, the present invention is implemented with the aid of an electronic device that is able to be integrated into the method. Technical further refinements of the method are described in the dependent claims.

In another specific embodiment, the method for automated driving is set up in such a way that when a take-control condition on the part of the driver arises, a take-control prompt will be output to the driver to take control of the automatically executed driving function. This notifies the driver that he is to take control of the vehicle.

According to another specific embodiment, the warning to the driver is a take-control prompt addressed to the driver. This signals to the driver that he should resume control of the vehicle if he uses an unapproved electronic device. Thus, the likelihood that the driver uses an unapproved electronic device during the automated driving is reduced. If an unapproved electronic device is being used, the driver is asked to take over the driving function. This increases the likelihood that the driver will abandon the use of the electronic device.

In another exemplary embodiment, the warning to the driver is output by an optical and/or acoustic and/or haptic signal. For example, this may be an acoustic signal that makes it clear to the driver that he is to take control of the vehicle again. Another possibility consists of signaling, via a display in the instrument cluster, that the driver is to resume the control. Another option consists of signaling to the driver to retake control with the aid of a vibrating component in the seat or on the steering wheel.

In another exemplary embodiment, the method for automated driving is set up in such a way that information is exchanged between the electronic device and the motor vehicle. For example, this is possible through a wireless data connection (Bluetooth, WLAN or others). In addition, electronic devices may be connected to the motor vehicle in a way that allows an exchange of data by connecting the electronic device to the motor vehicle with the aid of a cable. Conceivable in this context, for example, is the connection of a mobile phone via a USB cable to the car radio. In devices that are integrated into the vehicle such as the radio or some other multi-media device, the data connection may likewise be realized with the aid of a cable. Here, the method is set up in such a way that electronic devices that are connected to the motor vehicle by a data line are defined as approved electronic devices. Unapproved electronic devices in this exemplary embodiment are all devices that are not connected to the vehicle via a data line. The use of devices connected by a data line is therefore allowed, but the use of devices not connected via a data line is forbidden.

In a further exemplary embodiment, the method for automated driving is set up in such a way that information is able to be exchanged between the electronic device and the motor vehicle, similar to the previous example. In addition, there exists a list of approved devices or device classes that is specified by the vehicle manufacturer. It is stored in a memory in the control unit and may be queried when the use of an electronic device is detected. Approved in this case are all devices that are both connected to the vehicle by a data connection and are stored as approvable in the memory.

In another specific embodiment, a warning is displayed to the driver on the connected electronic device by optical and/or acoustic and/or haptic signals. This ensures that a driver who uses an electronic device during the automated driving receives prompts to take control directly on the used device. This markedly reduces the likelihood that the driver fails to notice the take-control prompt.

In another specific embodiment, the method is set up in such a way that in the event of a warning to the driver, an electronic device, especially an approved electronic device that the driver is using, is restricted in its functioning. For example, this may be done by darkening the screen and by the device no longer responding to inputs by the driver. This may draw the driver's attention even more strongly to the warning.

In another specific embodiment, electronic devices that are connected to the motor vehicle via a data line are unapproved electronic devices. This is meaningful particularly if in addition to the general permission to use electronic devices, certain electronic devices are to be excluded from use.

In another specific embodiment, the use of unapproved electronic devices is recorded in a memory. In case of an accident in which the vehicle is involved, for example, it can then be verified whether the driver used unapproved electronic devices.

The objective is achieved with the aid of a data-processing device that is suitable for realizing one of the methods in the enumerated specific embodiments. The individual method steps of the specific embodiments may be stored in the data-processing device in the form of a program.

The objective is achieved with the aid of an electronic device which is developed in such a way that it is connectable to a data-processing device via a data connection, and which is developed so that the described method is able to be executed.

In another specific embodiment, the electronic device may display optical and/or acoustic and/or haptic signals if it receives the corresponding information from the data-processing device.

In another specific embodiment, the electronic device may be restricted in its functioning if it receives the corresponding information from the data-processing device.

Exemplary embodiments of the present invention are explained on the basis of the following figures. The figures in the schematic drawings are described as follows.

DETAILED DESCRIPTION

Figure 1:
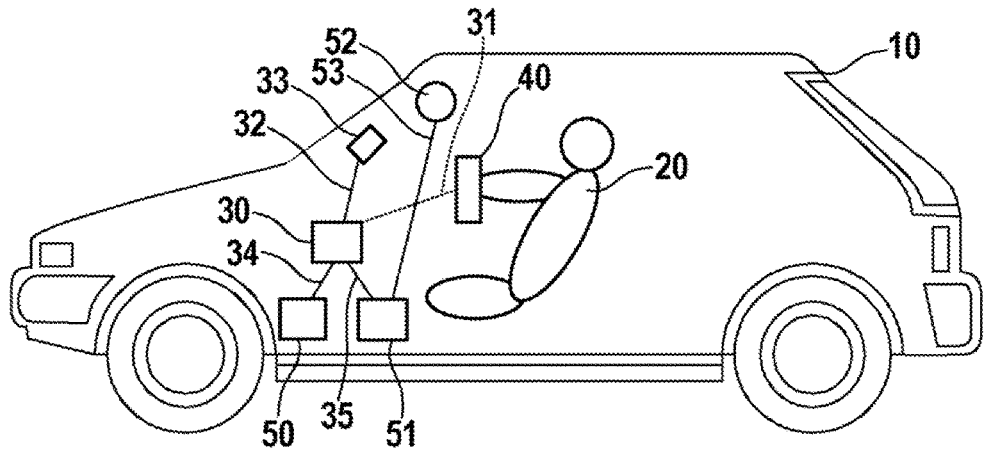
FIG. 1 shows a general drawing of a driver, vehicle and electronic device.

FIG. 1 shows a vehicle 10 with a driver 20 and a data-processing device 30. Via data line 31, data-processing device 30 is able to be connected to an electronic device 40. Data line 31 may be a cable and also a wireless connection (e.g., Bluetooth, WLAN). A signal transmitter 33 is connected to data-processing device 30 by an additional data line 32. Further data-processing devices 50, 51 are connected to data-processing device 30 with the aid of additional data lines 34, 35. Data-processing device 30 is the interface between additional data-processing devices 50, 51 and the electronic device. Data-processing device 30 is set up in such a way that it is able to exchange data with data-processing devices 50 and 51. In addition, data-processing device 30 is developed so that it is able to identify whether or not an electronic device 40 is approved. If electronic device 40 is connected to data-processing device 30 through data line 31, data-processing device 30 is configured to be able to output instructions for the output of signals and/or commands to restrict the functioning of the electronic device. Other methods that are required for automated driving are executed by second data-processing device 50. Third data-processing device 51 is configured for carrying out the driver monitoring. Data-processing devices 30, 50, 51 may also be implemented as a data-processing device in hardware and/or software.

When the automated driving begins, i.e. the automatic execution of at least one driving function of the vehicle, data-processing device 50 takes over the control of the vehicle in the longitudinal and lateral directions. Driver 20 may attend to other matters. At the same time, third data-processing device 51 starts with the method for driver monitoring.

If driver 20 begins using an electronic device 20, it will be detected by third data-processing device 51. For example, this detection may be realized with the aid of a sensor 52, which is connected via a data line 53 to data-processing device 51. Sensor 52 may be a camera, for example. Electronic device 40 used by driver 20 is able to be identified by comparing an image from the camera with images of electronic devices that are stored in a database in data-processing device 51. In a first exemplary embodiment, a comparison of the images from the camera and the database makes it possible to determine whether the device is approved. If the device is not approved, then a warning will be output to the driver with the aid of signal transmitter 33. In another exemplary embodiment, this warning may consist of a take-control prompt for the driver to take over the driving function.

In another exemplary embodiment, the manufacturer of the vehicle or of the system for automated driving specifies which electronic devices or which device categories are fundamentally approved. If the use of one of these devices is detected by data-processing device 51, and if data-processing device 30 detects, particularly at the same time, that electronic device 40 is connected via data line 31, then the electronic device is considered approved and may be used.

In a further exemplary embodiment, a signal transmitter 33 outputs an optical and/or acoustic and/or haptic warning to driver 20 if the driver uses an unapproved electronic device. This warning increases the likelihood that driver 20 ceases the use of the unapproved electronic device. Data-processing device 51 repeats the method for driver monitoring at regular time intervals.

In another exemplary embodiment, electronic device 40 is connected to data-processing device 30 via data connection 31 and thus is considered an approved electronic device. If electronic device 40 is connected to data-processing device 30 by data line 31, then take-control prompts may be transmitted to driver 20 both with the aid of signal transmitter 33 and electronic device 40, using optical and/or acoustic and/or haptic signals. This signals to driver 20 that electronic device 40 should be put aside and the driver himself should take control of vehicle 10 again. In another exemplary embodiment, the electronic device may be configured to be restrictable in its functioning in the event of a take-control prompt. The restriction of the functioning may be realized by darkening the screen, by deactivating the input options, and/or by reducing the volume of sounds played by the electronic device, for example.

Electronic device 40 is able to be implemented as a mobile telephone, a tablet PC, and a notebook but also as a device which is integrated into the vehicle such as a radio, television, navigation device, or also as a man-machine interface including an Internet functionality.

In a further exemplary embodiment, an electronic device 40 is connected via data line 31 to data-processing device 30 in vehicle 10. However, this electronic device is not approved. For example, in certain driving situations of automated driving, the use of notebooks may not be allowed. Notebooks would then not be approved despite being connected to the data-processing device by a data line. In this case, it is possible to display the take-control prompt to the driver on unapproved electronic device 40.

In another exemplary embodiment, data-processing device 30 records the use of an unapproved electronic device in a memory. In the event of an accident, for example, it is then possible to verify whether the driver has used an unapproved electronic device.

In addition to the driver taking control in response to a take-control prompt, it may also be the case that the driver wants to resume the control of the vehicle of his own volition. Here, in particular, it may be provided that the driver assumes control of the automated driving again through an intervention in the vehicle control, which means that the driving function of the vehicle is determined by a driver input.

Figure 2:
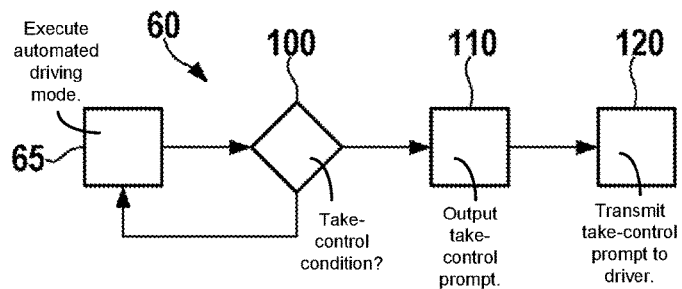
FIG. 2 shows multiple program steps of the method for automated driving.

FIG. 2 shows a program sequence 60, which the second data-processing device executes during the automated driving. In a first program step 65, the program is in the automated driving mode, which is to say, the vehicle performs at least one driving motion automatically. In a second program step 100, it is queried whether a take-control condition is present. This enables the data-processing device to decide whether or not the automated driving should continue, or whether the driver himself is to resume the driving function again. For example, a take-control condition is present if a system limit of the automated driving has been reached or if the driver uses an unapproved electronic device.

If no take-control condition is present, the method switches to first program step 65 again.

If a take-control condition is present, then it is specified in a third program step 110 that a take-control prompt should be output. In a fourth program step 120, the take-control prompt is transmitted to the driver in the form of a signal. This signal may be an optical and/or acoustic and/or a haptic warning to the driver, which may be output either by the vehicle or by a connected electronic device. The signal is meant to alert the driver to the pending takeover of the vehicle control.

If the driver fails to take control or fails to do so in a timely manner, then an additional program step, which is executed by a data-processing device, may provide that the vehicle be braked down to standstill.

Figure 3:
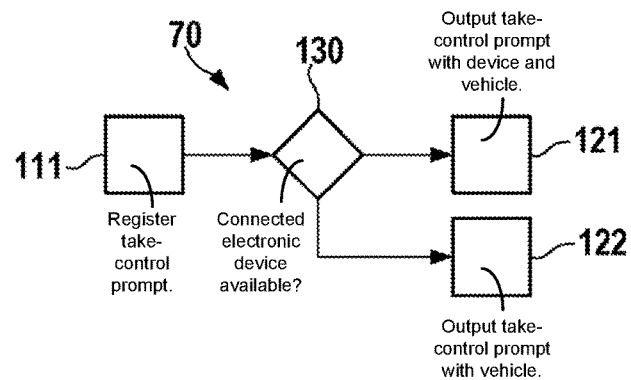
FIG. 3 shows multiple program steps for the output of take-control prompts to the driver.

FIG. 3 shows a program sequence 70, which first data-processing device executes in case of a take-control prompt in order to decide whether the take-control prompt is able to be output on an electronic device. In a first program step 111, a take-control prompt is registered. If a take-control prompt exists, it is checked in a second program step 130 whether a connected electronic device is available. If this check is positive, then the take-control prompt will be displayed in program step 121 both on the connected device and by the signal transmitter in the vehicle, and/or the electronic device will be restricted in its functioning.

If the existence of a connected electronic device is not confirmed in program step 130, then the take-control prompt in program step 122 is indicated only by the signal transmitter in the vehicle.

The display of take-control prompts on connected electronic devices increases the likelihood that the driver will notice the take-control prompt. This is true in particular if the driver uses an electronic device that may possibly distract his attention from pending take-control prompts.

In order to be able to execute this method, it is necessary that the data-processing device which triggers the output of a take-control prompt has access to the electronic device.

Figure 4:
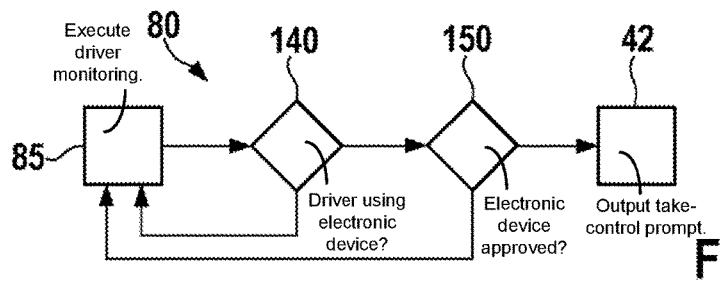
FIG. 4 shows multiple program steps for driver monitoring.

FIG. 4 shows a program sequence 80 for monitoring a driver. In a first program step 85, the driver monitoring is active. In a second program step 140, the third data-processing device, which is responsible for the driver-monitoring task, checks whether the driver is using an electronic device. For example, this may be accomplished with the aid of a camera that is pointed at the driver. If the driver begins to take his eyes off the road and gazes at an area in front of his torso, then an image-processing program may be used to check whether the driver is holding an electronic device in his hands there.

If the driver is not using an electronic device, program step 85 will be started anew following a certain waiting period. If the driver is using an electronic device, then it will be checked in a third program step 150 whether the device is approved. For example, this may be done by comparing the image from the camera with images of electronic devices stored in a database. Another option consists of the data-processing device checking whether the electronic device is connected to the data-processing device by a data line and is thus considered an approved electronic device. However, other methods may be employed as well for the purpose of determining whether or not an electronic device is approved. If it is an approved electronic device, then program step 85 will be started anew following a certain waiting period.

If the check in program step 150 reveals that the electronic device is not approved, then a take-control prompt is output in a fourth program step 112, thereby starting program sequence 70 from FIG. 3.

What is claimed is:

1. A method for automatically executing at least one driving function of a motor vehicle, the method comprising:
   while in an automated driving mode of the vehicle, determining that a driver is using an unapproved electronic device during the automated driving mode, wherein determining that the driver is using the unapproved electronic device during the automated driving mode includes:
      monitoring, using a processor, the driver of the motor vehicle using images from a camera of the vehicle, the images being of the driver and an electronic device; and
      determining whether the electronic device is connected to the processor by a data line and is considered an approved electronic device, wherein information is exchanged between a control unit of the vehicle and the electronic device, and electronic devices that are stored as approved in a memory are identified as approved electronic devices; and
   in response to determining that the driver is using the unapproved electronic device during the automated driving mode, outputting, using the processor, a warning to the driver, wherein the warning includes a take-control prompt.

2. The method of claim 1, wherein if a take-control condition occurs during the automated driving mode, the take-control prompt is output to the driver to take control of an automatically executed driving function of the automated driving mode.

3. The method of claim 2, wherein the warning is output on the electronic device using at least one of: an optical signal, an acoustic signal, or a haptic signal.

4. The method of claim 1, wherein the warning is indicated with at least one of: an optical signal, an acoustic signal, or a haptic signal.

5. The method of claim 1, wherein information is exchanged between the control unit of the motor vehicle and the electronic device, and electronic devices that exchange information with the motor vehicle are defined as approved electronic devices.

6. The method of claim 1, wherein the electronic device used by the driver is restricted in the functioning when a warning is output.

7. The method of claim 1, wherein information is exchanged between the unapproved electronic device and the motor vehicle.

8. The method of claim 1, wherein the use of the unapproved electronic device is recorded in a memory.

9. The method of claim 1, wherein the unapproved electronic device includes a notebook computer.

10. The method of claim 1, wherein the warning is output using the unapproved electronic device.

11. The method of claim 1, further comprising capturing the images of the driver and the electronic device.

12. The method of claim 1, further comprising processing the images to determine that the driver is holding the electronic device.

13. A data-processing device for automatically executing at least one driving function of a motor vehicle, comprising:
a processor configured for:
  while in an automated driving mode of the vehicle, determining that a driver is using an unapproved electronic device during the automated driving mode, wherein determining that the driver is using the unapproved electronic device during the automated driving mode includes:
    monitoring the driver of the motor vehicle using images from a camera of the vehicle, the images being of the driver and an electronic device; and
    determining whether the electronic device is connected to the processor by a data line and is considered an approved electronic device, wherein information is exchanged between a control unit of the vehicle and the electronic device, and electronic devices that are stored as approved in a memory are identified as approved electronic devices; and
  in response to determining that the driver is using the unapproved electronic device during the automated driving mode, outputting a warning to the driver, wherein the warning includes a take-control prompt.

14. A vehicle, comprising:
at least one processor for automatically executing at least one driving function of the vehicle;
wherein the at least one processor is configured for:
  while in an automated driving mode of the vehicle, determining that a driver is using an unapproved electronic device during the automated driving mode, wherein determining that the driver is using the unapproved electronic device during the automated driving mode includes:
    monitoring, using the at least one processor, the driver of the motor vehicle using images from a camera of the vehicle, the images being of the driver and an electronic device; and
    determining whether the electronic device is connected to the at least one processor by a data line and is considered an approved electronic device, wherein information is exchanged between a control unit of the vehicle and the electronic device, and electronic devices that are stored as approved in a memory are identified as approved electronic devices; and
  in response to determining that the driver is using the unapproved electronic device during the automated driving mode, outputting a warning to the driver, wherein the warning includes a take-control prompt.

15. An electronic device, comprising:
an interface configured to be connected via a data connection to a data-processing device of a motor vehicle; and
a display to display a warning to a driver with at least one of: an optical signal, an acoustic signal, or a haptic signal;
wherein the data-processing device is configured for:
  while in an automated driving mode of the vehicle, determining that the driver is using an unapproved electronic device during the automated driving mode, wherein determining that the driver is using the unapproved electronic device during the automated driving mode includes:
    monitoring, using the data-processing device, the driver of the motor vehicle using images from a camera of the vehicle, the images being of the driver and an electronic device; and
    determining whether the electronic device is connected to the data-processing device by a data line and is considered an approved electronic device, wherein information is exchanged between a control unit of the vehicle and the electronic device, and electronic devices that are stored as approved in a memory are identified as approved electronic devices; and
  in response to determining that the driver is using the unapproved electronic device during the automated driving mode, outputting a warning to the driver, wherein the warning includes a take-control prompt.

16. The electronic device of claim 15, wherein the electronic device is restricted in its functioning when the warning is output to the driver.

17. A method for automatically executing at least one driving function of a motor vehicle, the method comprising:
while in an automated driving mode of the vehicle, monitoring, using a processor, a driver of the motor vehicle using images from a camera of the vehicle, and determining that the driver is using an unapproved electronic device during the automated driving mode based on the images from the camera, wherein the determining that the driver is using the unapproved electronic device during the automated driving mode includes comparing the images from the camera to images of electronic devices stored in a database; and
in response to determining that the driver is using the unapproved electronic device during the automated driving mode, outputting, using the processor, a warning to the driver, wherein the warning includes a take-control prompt.

18. The method of claim 17, wherein the comparing the images from the camera to the images stored in the database is performed to determine if the device is unapproved.

19. The method of claim 17, wherein the warning is output using the unapproved electronic device.

20. The method of claim 17, further comprising processing the images to determine that the driver is holding the unapproved electronic device.

* * * * *